United States Patent
Gherman

(10) Patent No.: US 11,462,122 B2
(45) Date of Patent: Oct. 4, 2022

(54) ILLUSTRATION INSTRUCTOR

(71) Applicant: Samuel Gherman, New York, NY (US)

(72) Inventor: Samuel Gherman, New York, NY (US)

( * ) Notice: Subject to any disclaimer, the term of this patent is extended or adjusted under 35 U.S.C. 154(b) by 763 days.

(21) Appl. No.: 16/394,943

(22) Filed: Apr. 25, 2019

(65) Prior Publication Data
US 2019/0333405 A1 Oct. 31, 2019

Related U.S. Application Data

(60) Provisional application No. 62/662,400, filed on Apr. 25, 2018.

(51) Int. Cl.
*G09B 11/04* (2006.01)
*G09B 11/06* (2006.01)
*G06V 20/00* (2022.01)

(52) U.S. Cl.
CPC .............. *G09B 11/04* (2013.01); *G06V 20/35* (2022.01); *G09B 11/06* (2013.01)

(58) Field of Classification Search
CPC .......... G09B 11/00; G09B 11/04; G09B 11/06
See application file for complete search history.

(56) References Cited

U.S. PATENT DOCUMENTS

| 6,568,938 | B1 * | 5/2003 | Prince | G09B 11/04 434/90 |
| 10,033,943 | B1 * | 7/2018 | Sharma | G09B 11/00 |
| 2004/0233219 | A1 * | 11/2004 | Aguera y Arcas | G06T 3/4007 345/475 |
| 2015/0221070 | A1 * | 8/2015 | Winnemoeller | G06T 11/001 382/203 |
| 2018/0096623 | A1 * | 4/2018 | Xia | A63F 13/92 |

* cited by examiner

*Primary Examiner* — Robert J Utama
(74) *Attorney, Agent, or Firm* — McCarter & English, LLP

(57) ABSTRACT

A system and method uses an electronic device with a camera and a viewing device to create an augmented reality environment by superimposing a virtual image onto a surface for a user to trace with a drawing apparatus. The system and method can be used to directly copy a virtual image onto a surface by hand and provides training, step by step drawing tools, and image verification. By looking through a user's device and following step by step lessons, the user is guided to complete an image.

11 Claims, 14 Drawing Sheets

ILLUSTRATION INSTRUCTOR

CROSS REFERENCE TO RELATED APPLICATIONS

This application claims priority to and benefit of U.S. Provisional Patent Application No. 62/662,400 filed on Apr. 25, 2018 entitled Illustration Instructor, the disclosure of which is hereby incorporated herein by reference in its entirety.

BACKGROUND OF THE INVENTION

1. Field of the Invention

The present invention relates to an apparatus and a method for teaching drawing technique. More particularly, the present invention relates to an apparatus and a method for drawing, learning techniques, and tracing existing pictures or portions thereof.

2. Description of the Related Art

Leonardo Da Vinci worked with optical inventions including the camera obscura. FIG. 1 is a camera obscura, which is a dark box (or even a very dark room) with a very small hole in one wall that lets in light. The small hole can include a lens. Directly across from the hole the image from the outside world will be projected onto the wall but upside down. In other words, the scene is reproduced, inverted (thus upside-down) and reversed (left to right), but with color and perspective preserved. The image can be projected onto paper, and can then be traced to produce a highly accurate representation.

The term "camera obscura" also refers to constructions or devices that make use of the principle within a box, tent, or room. Camera obscurae with lenses in the opening have been used since the second half of the 16th century and became popular as an aid for drawing and painting. The camera obscura box was developed further into the photographic camera in the first half of the 19th century when camera obscura boxes were used to expose light-sensitive materials to the projected image.

A camera lucida, shown in FIG. 2, is an optical device used as a drawing aid by artists. The camera lucida performs an optical superimposition of the subject being viewed upon the surface upon which the artist is drawing. The artist sees both scene and drawing surface simultaneously, as in a photographic double exposure. This allows the artist to duplicate key points of the scene on the drawing surface, thus aiding in the accurate rendering of perspective.

The name "camera lucida" (Latin for "light chamber") is intended to recall the much older drawing aid, the camera obscura (Latin for "dark chamber"). There is no optical similarity between the devices. The camera lucida is a light, portable device that does not require special lighting conditions. No image is projected by the camera lucida.

In its simplest form of camera lucida, the artist looks down at the drawing surface through a half-silvered mirror tilted at 45 degrees. This superimposes a direct view of the drawing surface beneath, and a reflected view of a scene horizontally in front of the artist. This design produces an inverted image which is right-left reversed when turned the right way up. Also, light is lost in the imperfect reflection.

SUMMARY OF THE INVENTION

The disclosed system and method uses an electronic device with a camera and a viewing device to create an augmented reality environment by superimposing a virtual image onto a surface for a user to trace with a drawing apparatus such as a pen, pencil, brush, or the like. The system and method can be used to directly copy a virtual image onto a surface by hand. Applications of the system and method can include, but are not limited to, drawing a picture on paper, decorating a cake or cookie with a specific design, or in reverse to compare a drawn image with a superimposed image. One aspect of the invention is an application running on an electronic device that provides training, step by step drawing tools, and image verification.

By looking through a user's device and following step by step lessons, the user is guided to complete an image.

According to one aspect of the invention, an uploaded image is able to be broken down into layers by either color or value, which corresponds to levels of darkness, so that the user can trace each layer individually in progressive steps. Each step would represent a color or value.

According to one aspect of the invention, a unique step-by-step tutorial mode is provided.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

In use, the device is placed above or behind the canvas. When the user looks through the device, both the image and the canvas are viewed simultaneously. The device functions as a type of projector or light board, however you can only see the projection as a display on the device.

According to one aspect of the invention, both the camera and the overlay image can be zoomed at the same to pick up micro details in the drawing or used to scale the drawing to any desired size.

The training provided by the method trains the user's eye to recognize proportions, identify differences in values and colors, and hand motions to make pleasing lines and stokes on paper.

The application can also be used as a tool to periodically check proportions of a free hand drawing. The application can also be used to lay out a complete drawing prior to beginning drawing or to check a piece work as it progresses.

The tracing and scaling features allow a user to combine multiple images into one drawing. For example a composite drawing can be created placing an animal's head on a person's body. The tracing feature can also be used to write intricate lettering such as calligraphy on anything. The application also allows a user to create an anamorphic drawings that look 3D.

An electronic device with a camera and a viewing device to create an augmented reality environment by superimposing a virtual image onto a surface for a user to trace with a drawing apparatus.

The system and method for directly copying a virtual image onto a surface by hand to draw a picture on paper, decorating a cake or cookie with a specific design, or in reverse to compare a drawn image with a superimposed image.

One aspect of the invention is an application running on an electronic device that provides training, step by step drawing tools, and image verification.

DETAILED DESCRIPTION OF THE PRESENTLY PREFERRED EMBODIMENTS

Figure 1A:
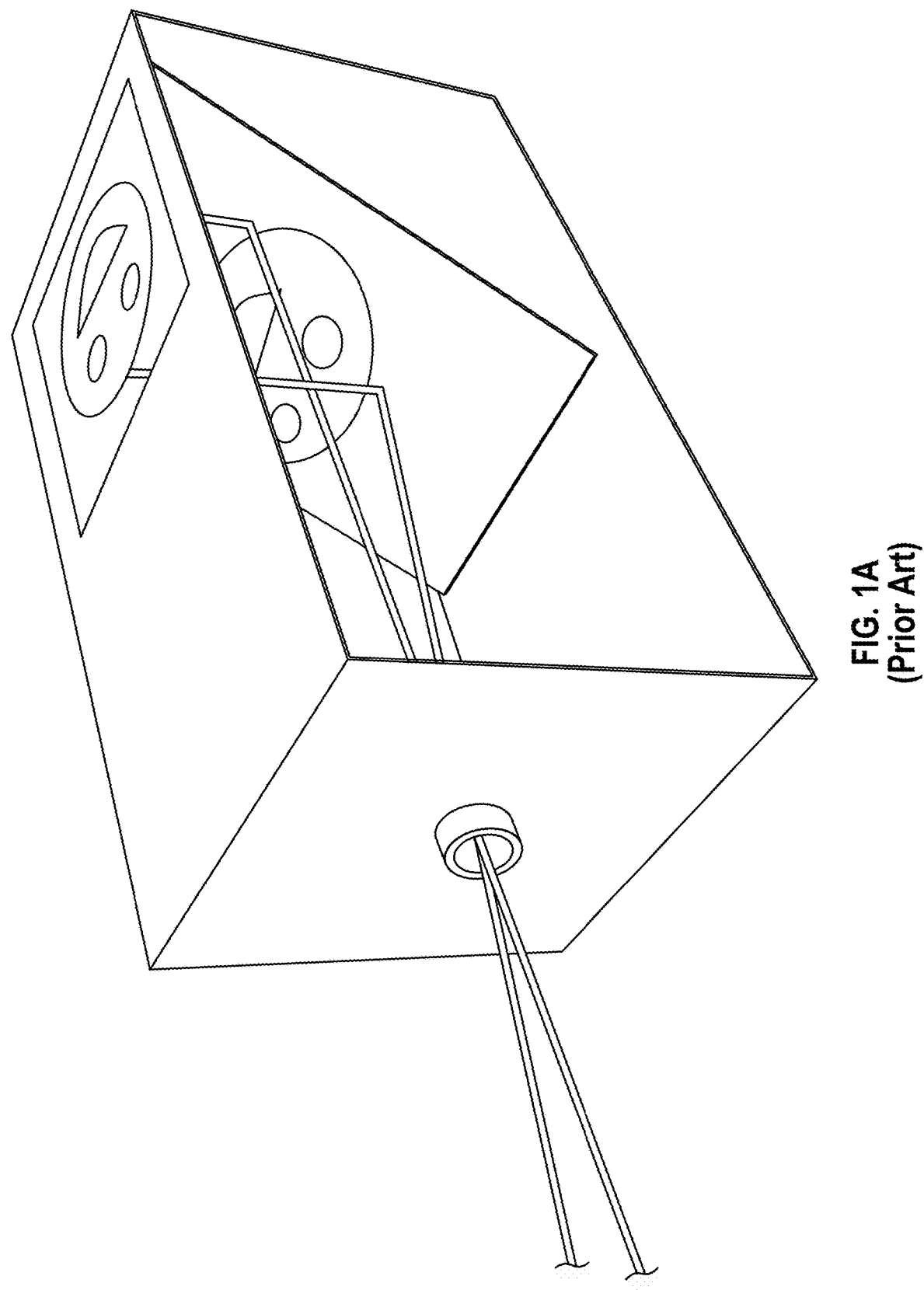
FIG. 1A is a camera obscura.
Figure 1B:
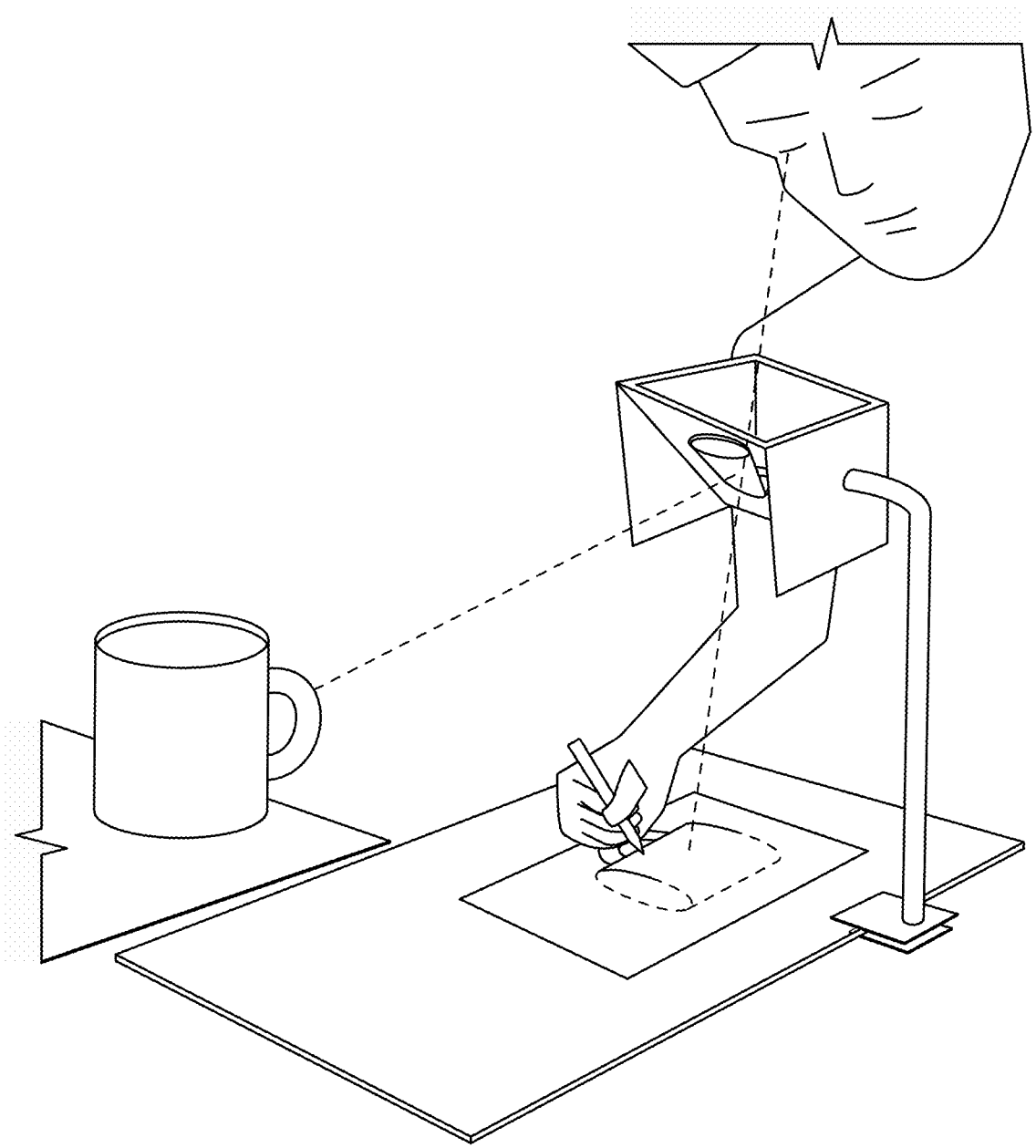
FIG. 1B is a camera lucida.
Figure 2:
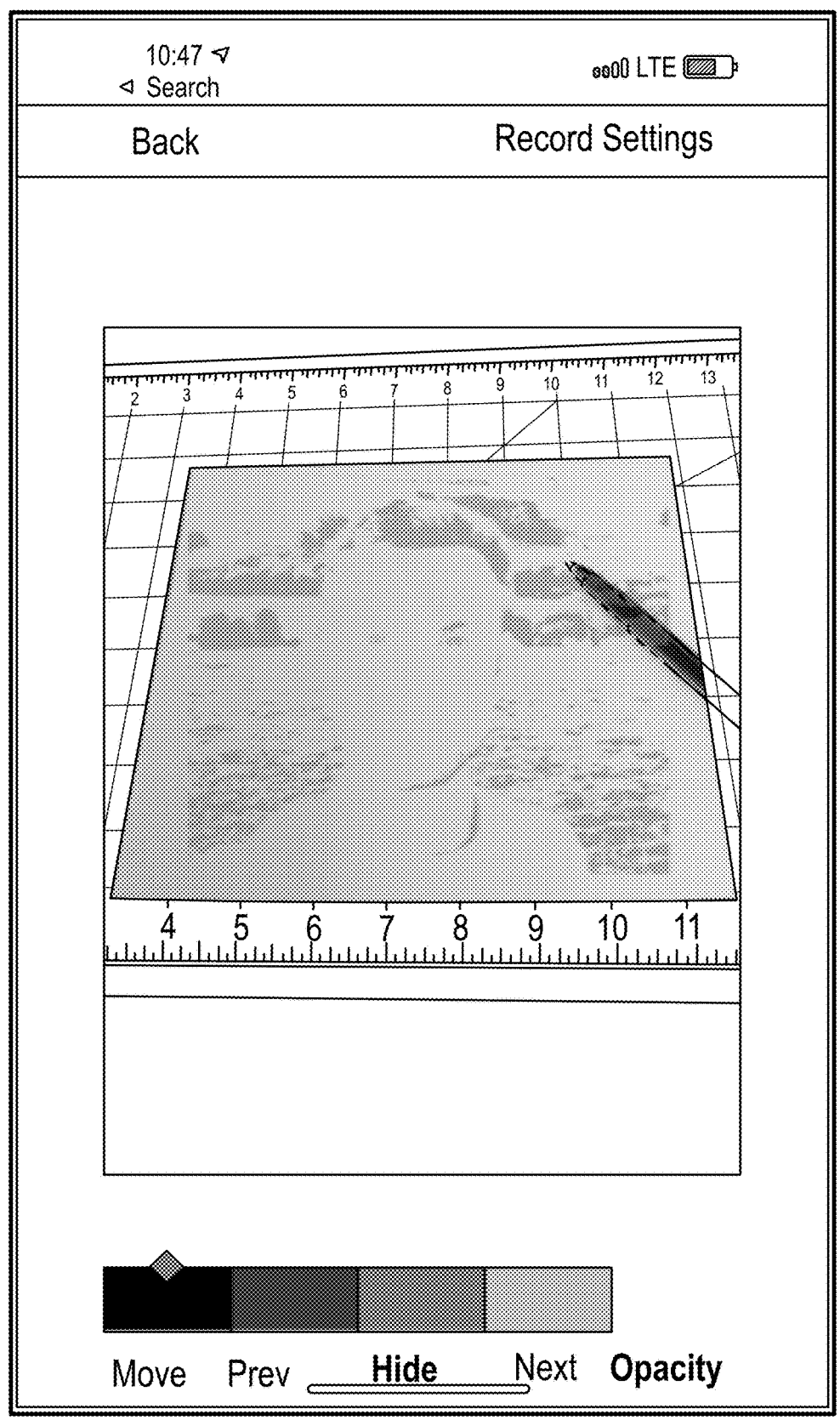
FIG. 2 is a first layer of an image.
Figure 3:
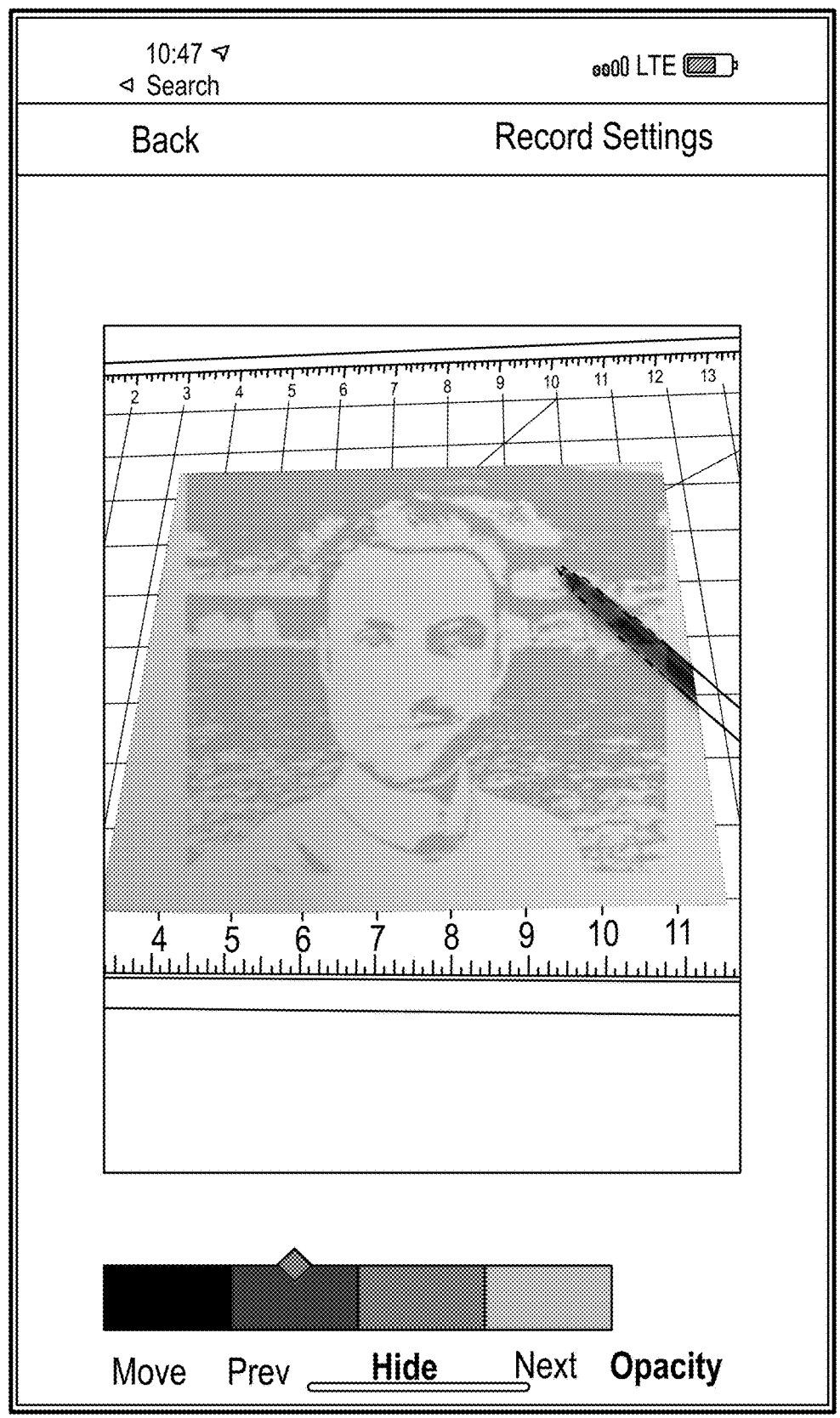
FIG. 3 is a second layer of the image.
Figure 4:
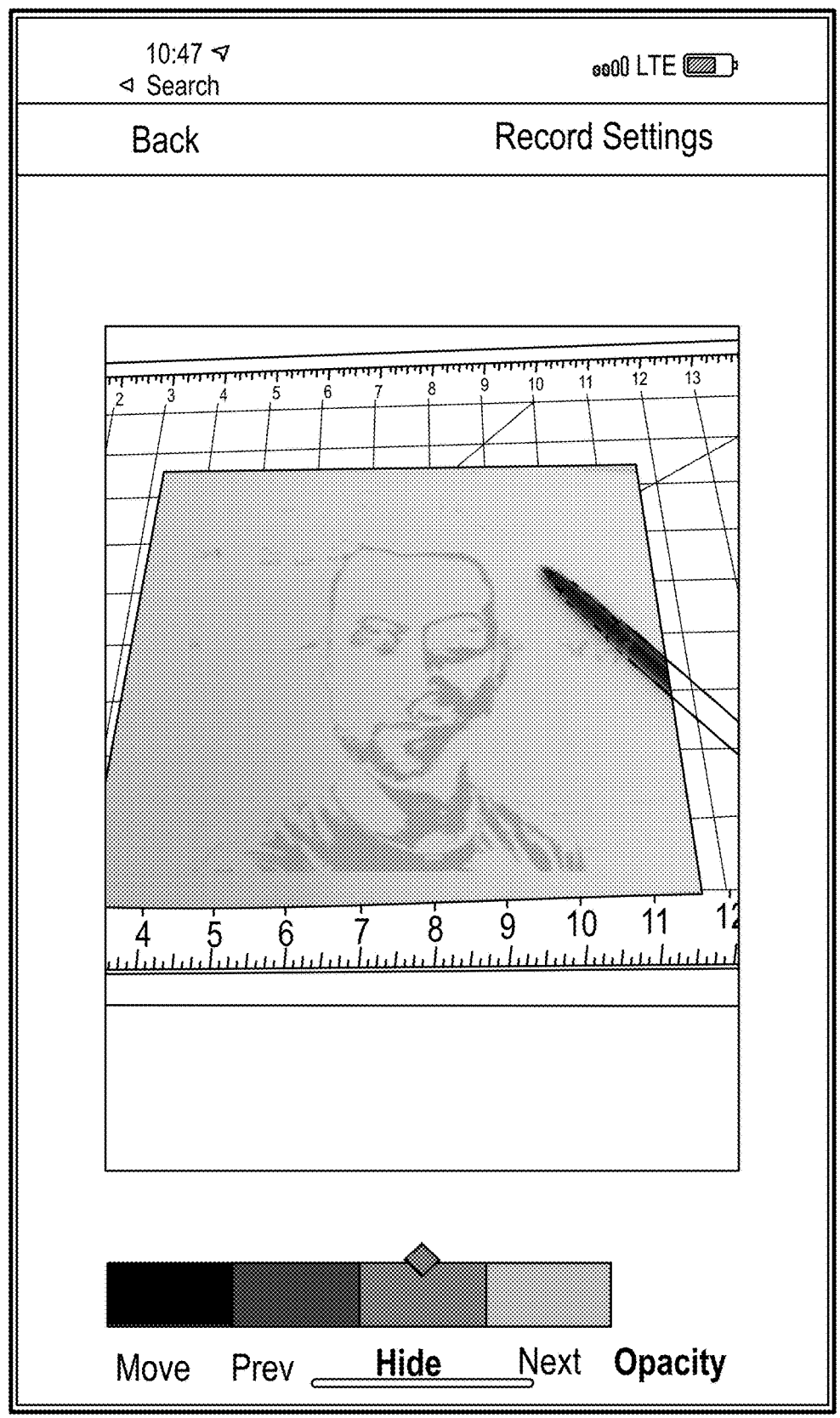
FIG. 4 is a third layer of the image.
Figure 5:
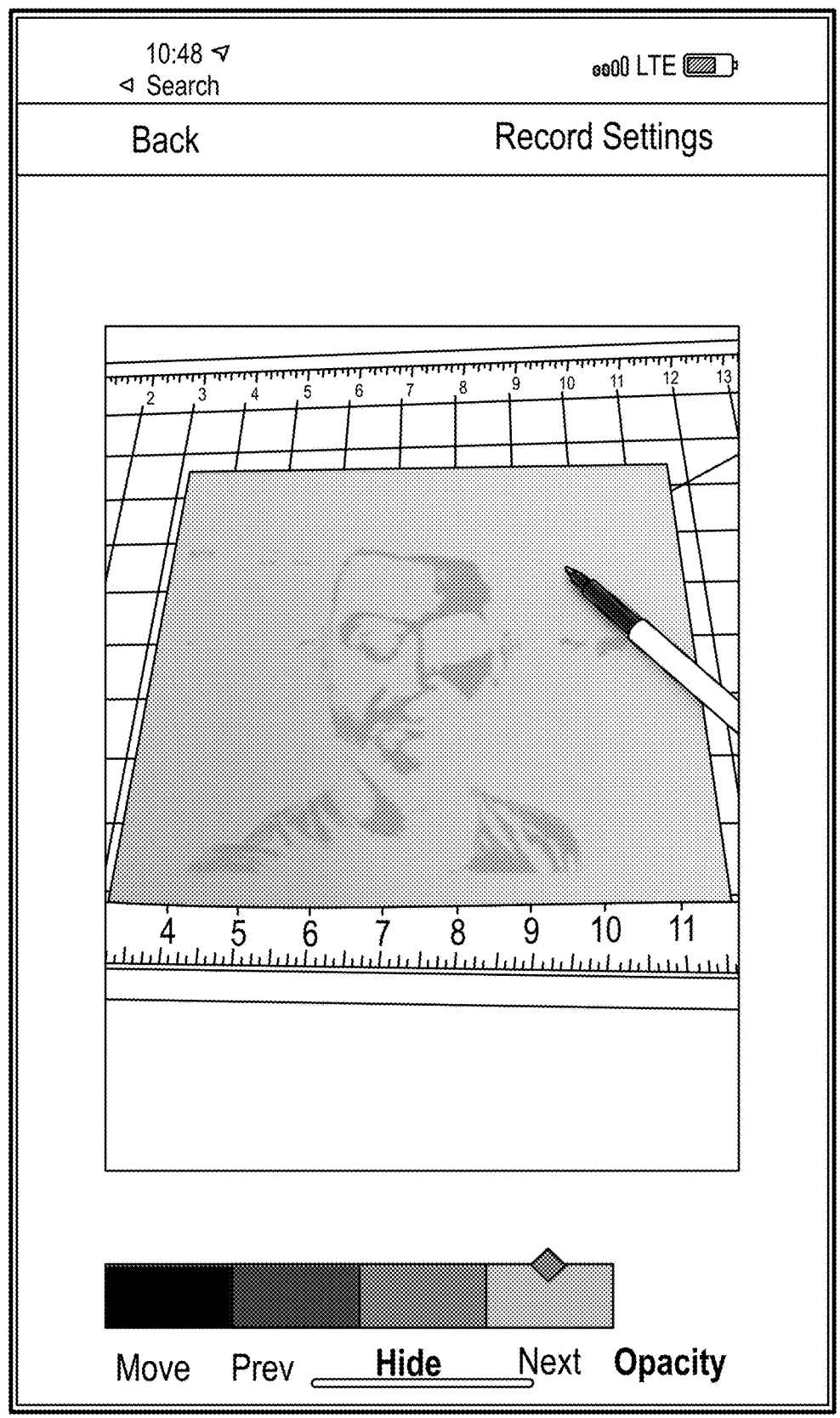
FIG. 5 is a fourth layer of the image.
Figure 6:
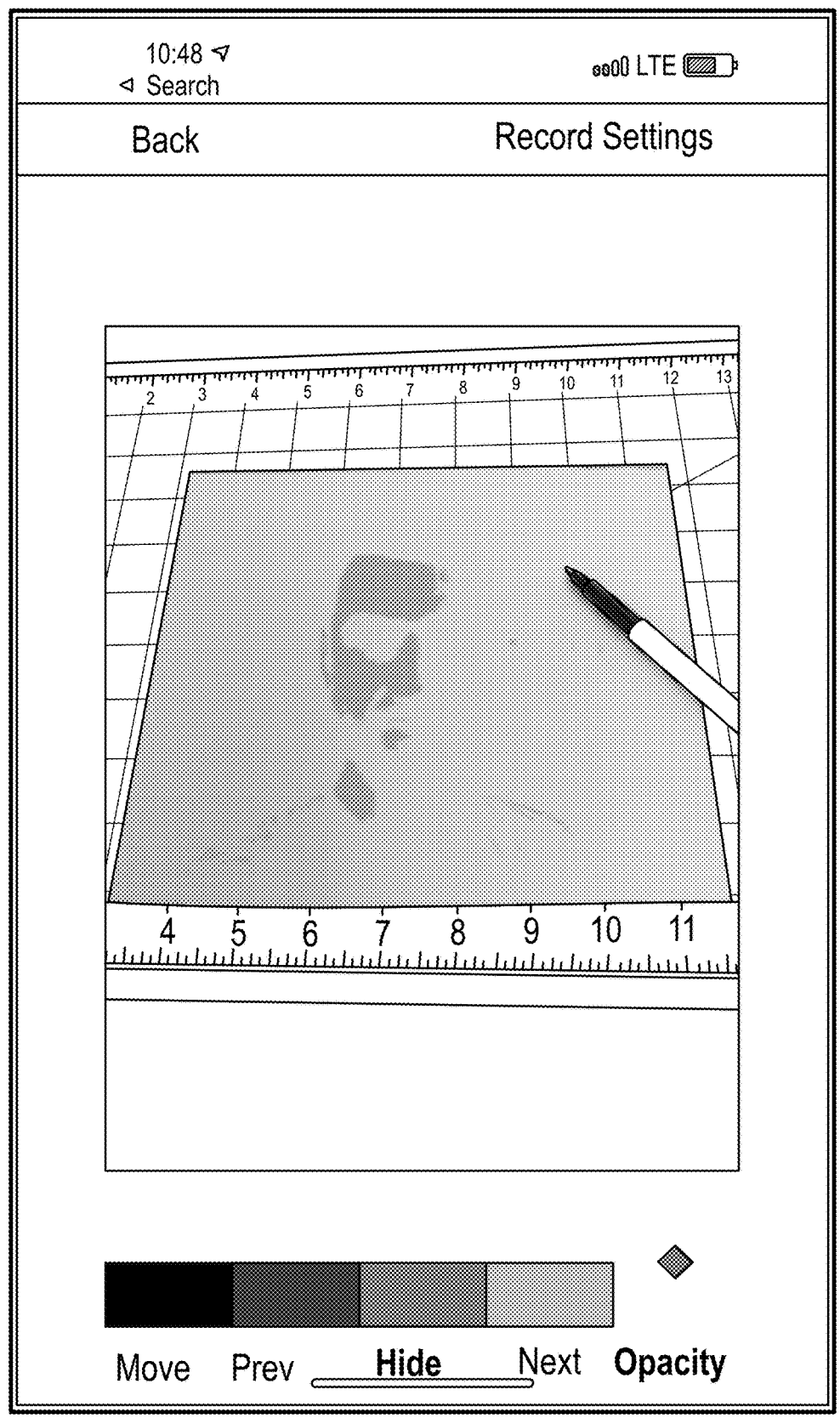
FIG. 6 is a fifth layer of the image.

The apparatus, which includes a camera, processing unit, and display, virtually superimposes an image over a real surface for a user to reference or trace. According to one aspect of the invention, the apparatus is a cellular phone, tablet, or the like. The method of teaching to drawing uses any device such as a mobile phone, tablet, or the like that has a camera and a screen using augmented reality. By looking through the device and following step-by-step lessons a user is guided to completing an image.

There are various modes of user experiences. All of the modes have settings that include: camera, strobe, grid and light features that can be modified by the user.

The camera setting, allows the user to pause the camera so they can easily compare what is on the screen with the image they are attempting to draw. This setting is used in situations where an artist trying to learn to draw by attempting to draw a picture freehand without the aid of the app. The artist then uses the app to see what areas are not accurate. Other camera setting adjust the focus of the camera to fit the user's preferences.

Using the strobe setting, the display of the device switches or strobes between the picture being drawn (the work) and the original picture that is being duplicated. Using the strobe setting, the user can compare the two pictures to determine is anything is missing from the duplicated drawing.

Using the grid, a grid is overlaid on the image to be drawn. The image can then be drawn in an enlarged or reduced manner using the grid. The grid is drawn in by the application and laid over the image and the camera at the same time. This method allows a user to use the popular method of drawing with a grid without having to put lines down on the paper. Using the grid also allows the user to more easily scale images up or down. The drawing is reproduced in a step-by-step manner, as the drawing is reproduced and the paper is stepped.

In a classic mode an image is uploaded from the device. The image can be stored on the device, retrieved from an online storage location, or the like. The application acts as a virtual tracing tool and has various levels of transparency that the user is able to modulate. By following along with the levels of gradient the user is able to create their picture.

An image to be drawn is overlaid on a real piece of paper using a device's camera. While looking through the device, while it is above the canvas, it creates a virtual projection that can be traced. This enables a user to create realistic looking artwork with perfect proportions, shading, and colors. The application allows a user to zoom in on both the camera and the overlay image at the same to pick up micro details in a drawing or scale the drawing to any desired size.

In the Step by Step Mode an image is broken down into layers by either color or value (levels of darkness) so the user can trace each layer individually in steps. The layers enable the user to draw or paint a picture in steps.

Figure 7:
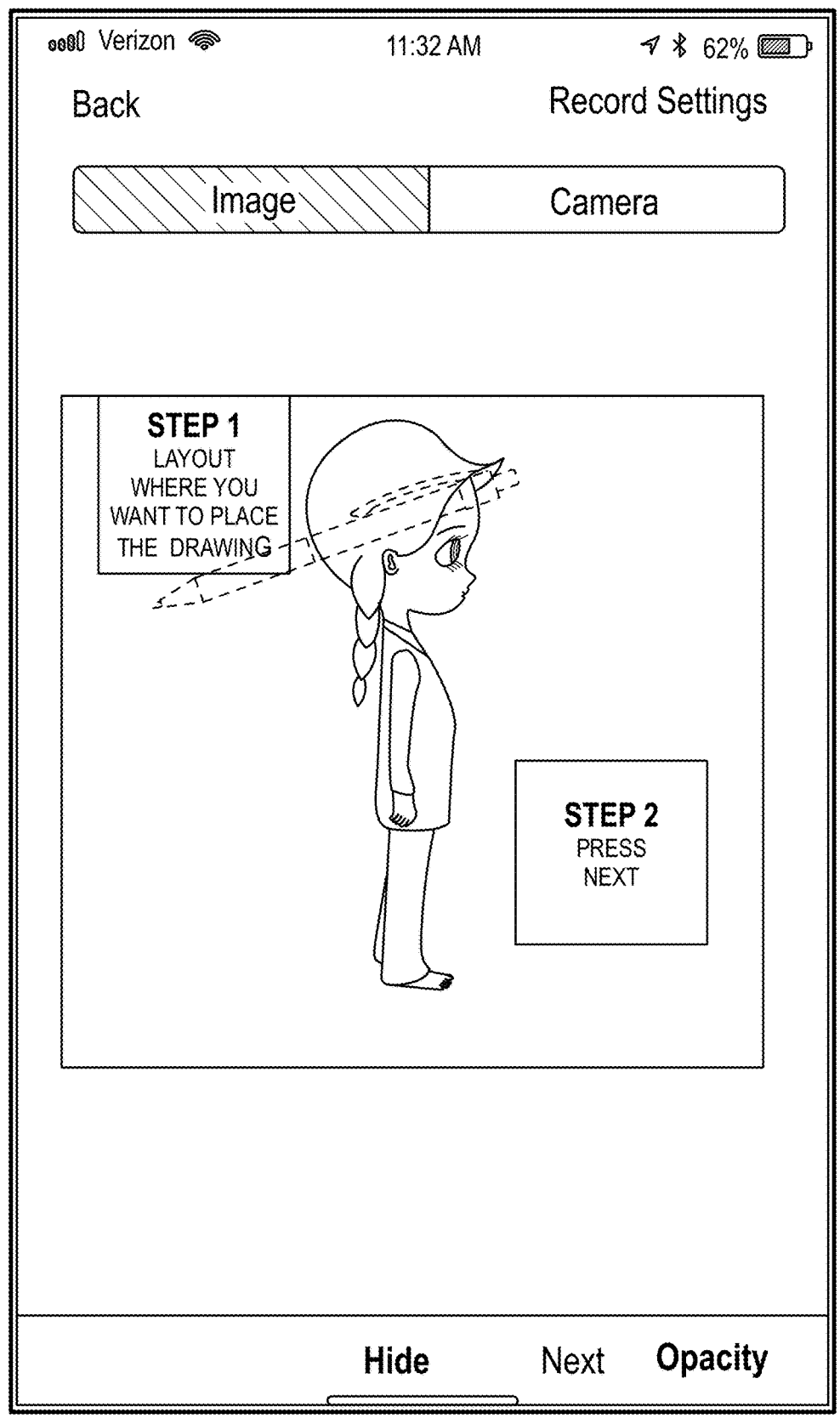
FIG. 7 is a first step in a drawing lesson.
Figure 12A:
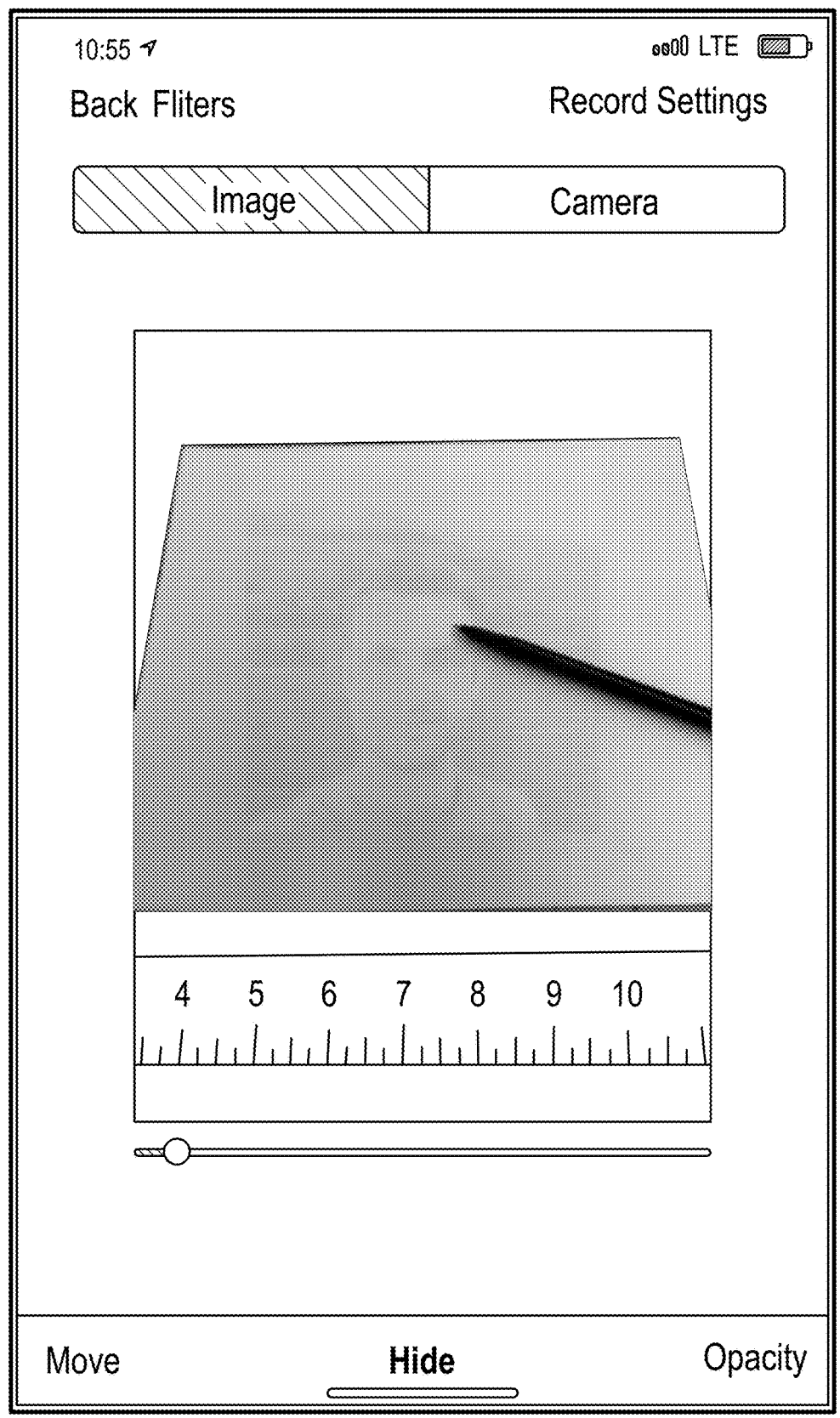
FIGS. 12A and 12B are images with different levels of opacity.
Figure 12B:
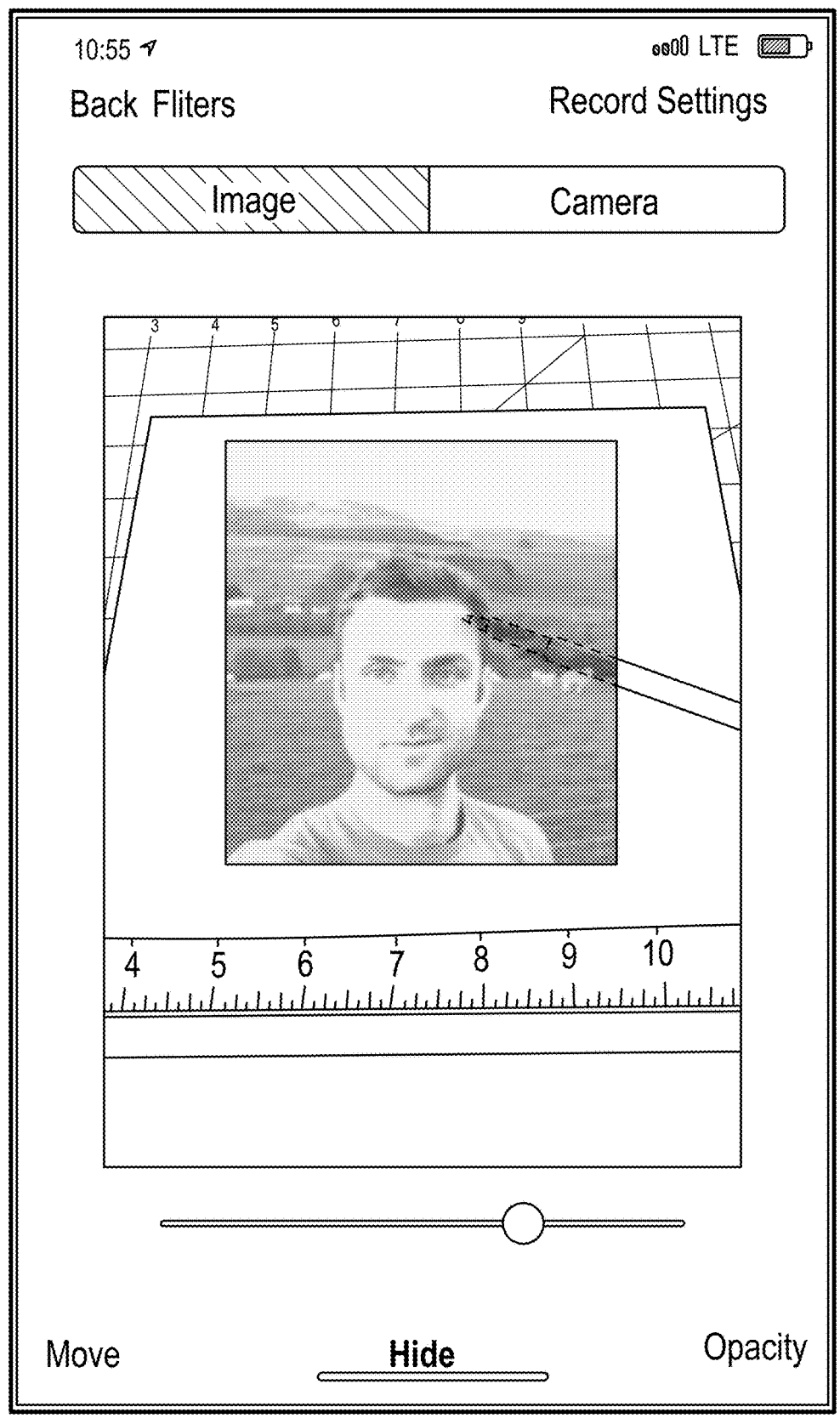

FIGS. 2-6 are examples of the step-by-step mode. In the step by step mode an image is first uploaded to be displayed on the device. The original image is shown with different opacities in FIGS. 12A and 12B. The device renders the image into layers, which vary by shade or color. A slider or other selection tool is used to display each of the layers to be drawn. The different layers correspond to colors or grey scale values according to a generated chart. The grey scale cam be seen beneath the image being drawn FIGS. 7-10 are sample images in a step-by-step lesson. As shown in FIG. 7, a pen and piece of paper are visible behind an anime girl that will be drawn. The pen is visible to demonstrate the transparency of the image to be drawn. The image is not projected onto the paper. The image is shown on the display of the device overlaid on the image of the paper where the user will draw the image.

Figure 8:
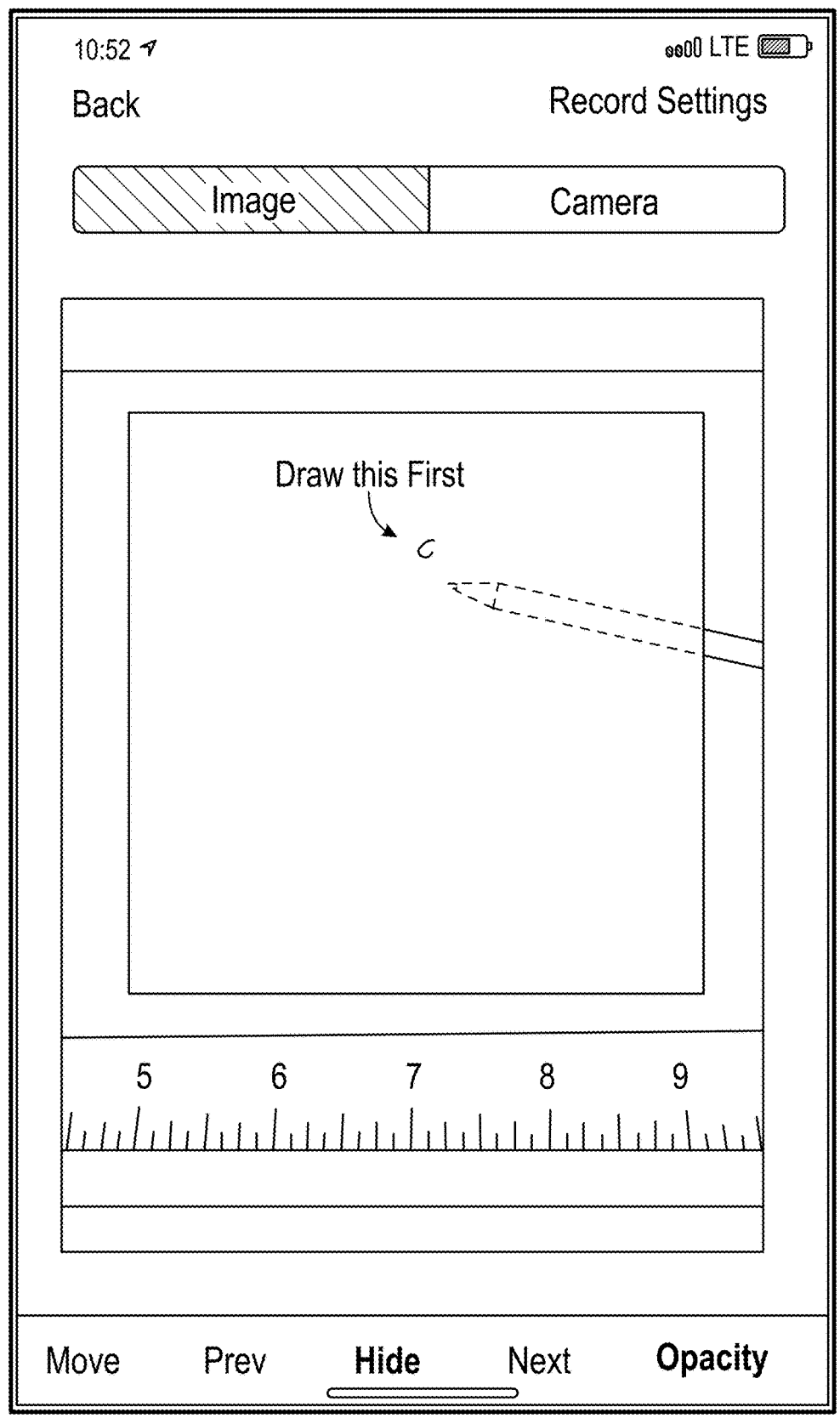
FIG. 8 is a second step in a drawing lesson.
Figure 9:
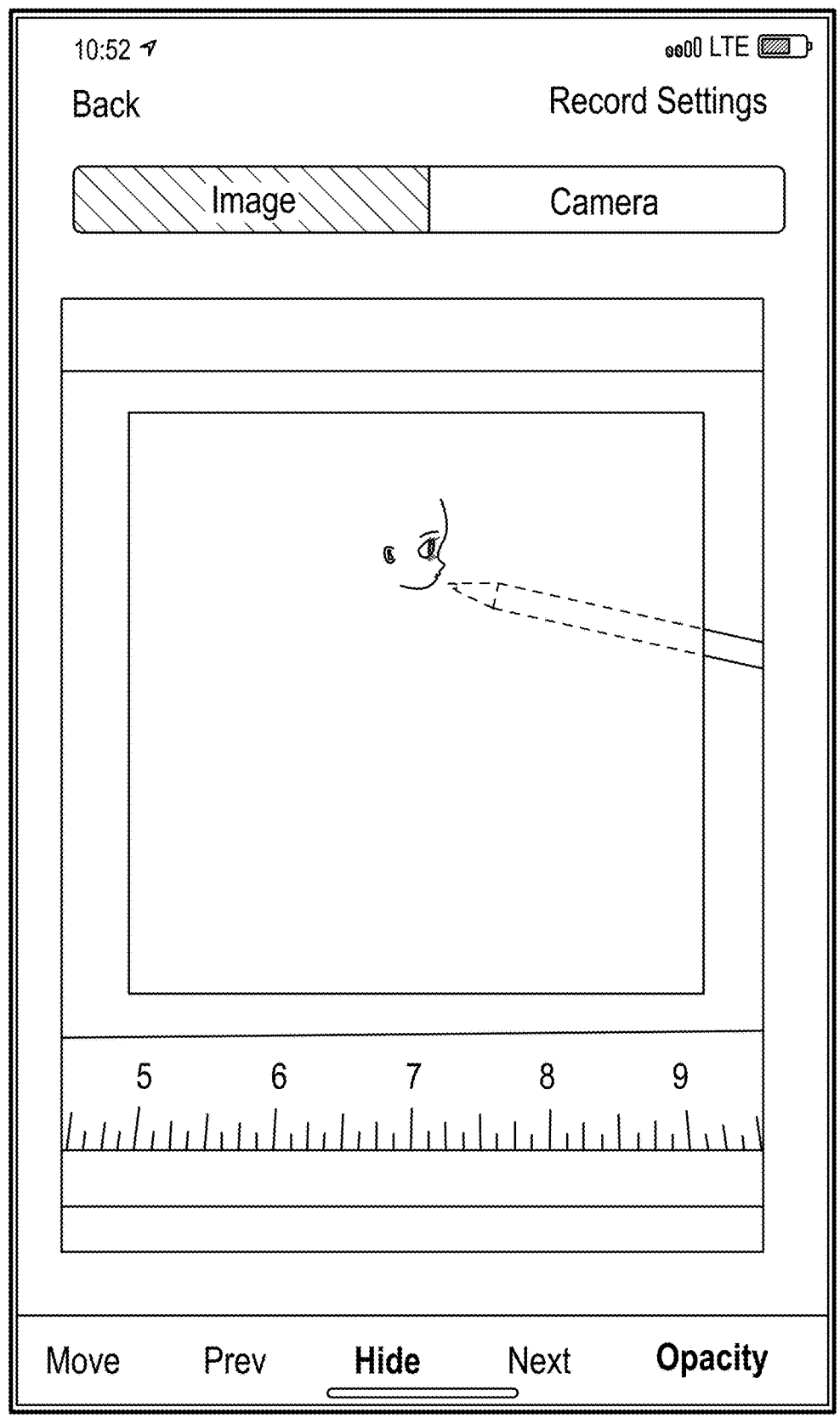
FIG. 9 is a third step in a drawing lesson.
Figure 10:
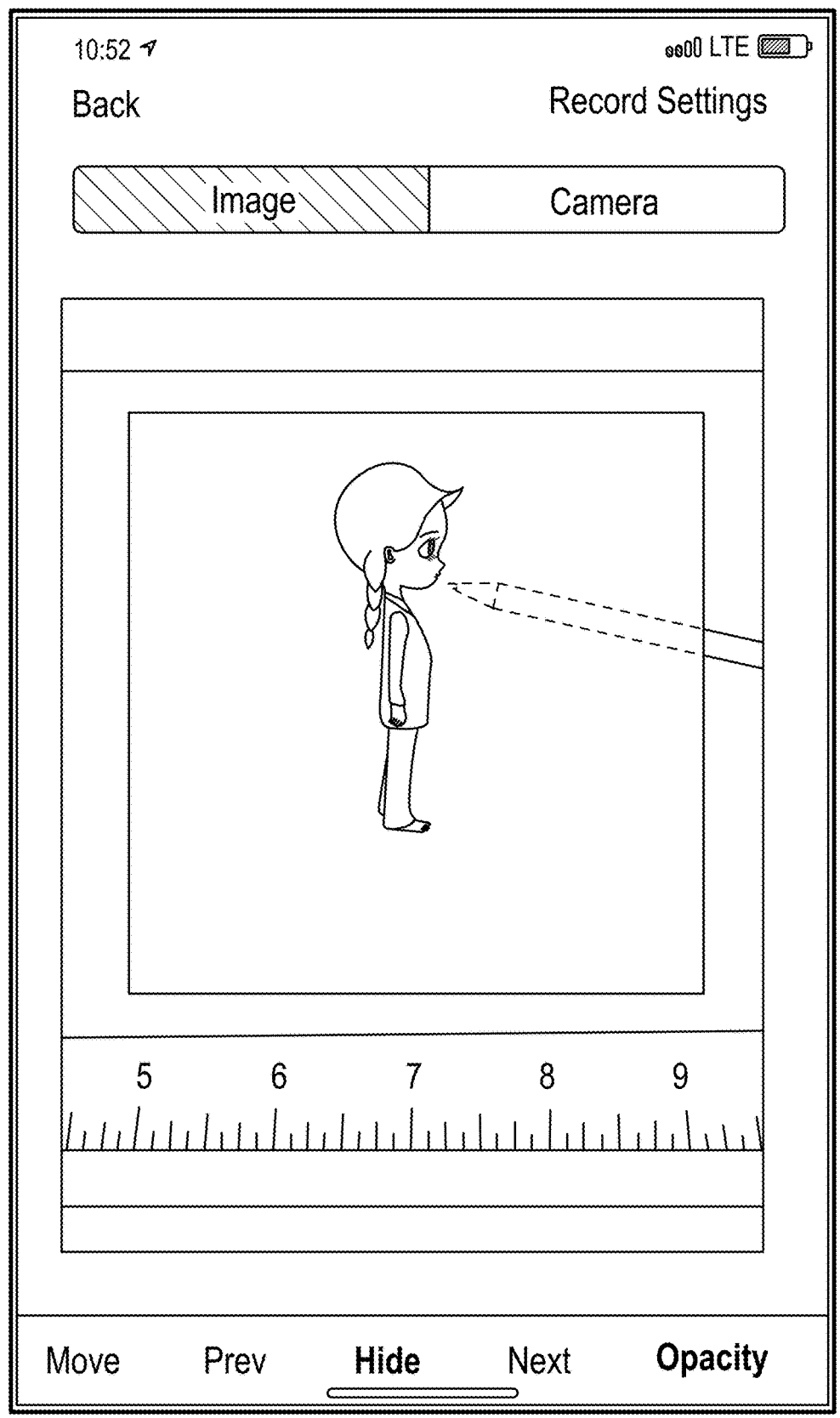
FIG. 10 is a finished drawing lesson.
Figure 11:
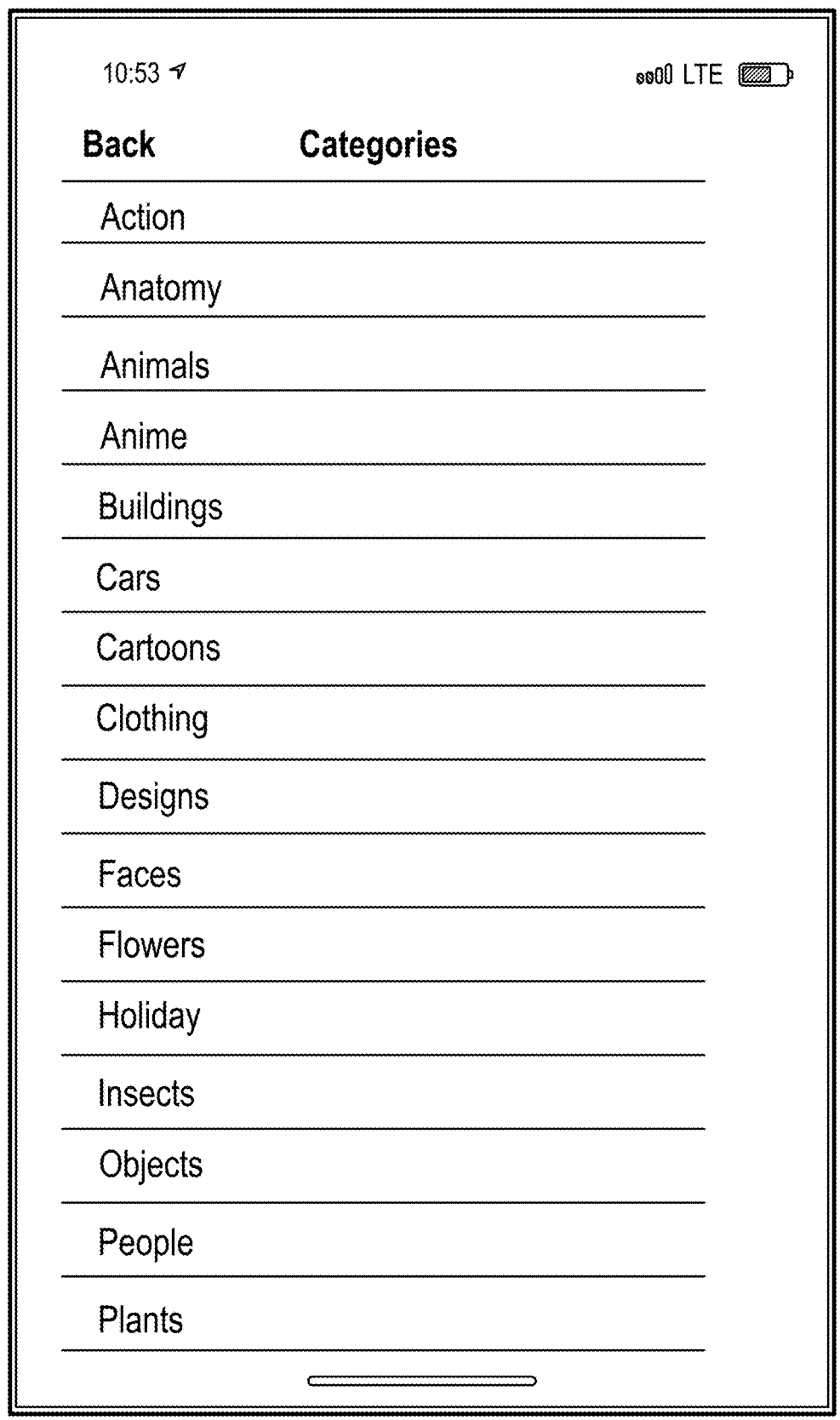
FIG. 11 are categories for drawing lessons.

Initially, an image to be drawn is selected. In this case, the image selected is an anime girl. Categories from which an image can be selected are shown in FIG. 11. Once the image is selected, the device is placed on a stand so that a user is able to view what will be drawn beneath the device, and the user decides on placement of the image on the page. The stand can be anything that lifts the device from the surface of the page. Once a location for the drawing is selected, the drawing begins. In this example, the first step is to begin drawing the anime girl's eye, as shown in FIG. 8. The lesson continues using a transparent line-by-line lesson as shown in FIG. 9. The finished outline of the anime girl is shown in FIG. 10.

The lessons mode uses augmented reality in which the user is able to follow along with a tutorial by tracing an image such as the anime girl in a step-by-step manner. The lessons mode is used to teach the user to draw using proportions. During the lessons mode users learn the fundamentals of drawing so that the user will eventually be able to draw without the application. Lessons include lines, shapes, figures, shading, perspective, and the like. The application allows a user to trace pictures or as a tool to periodically check proportions as the user draws free hand. This insures that while drawing a portrait the elements are each in their proper place. Users can lay everything out in a drawing prior to beginning to draw and then check the drawing as is proceeds.

In each of the modes of operation, an overlay of an image to be drawn is overlaid over a piece, of paper or other medium to be drawn on, using the device's camera. Looking at the display of the device, while it is above the canvas, creates a virtual projection that can be traced. This enables the user to create realistic looking artwork with perfect proportions, shading, and colors. Various effects can be applied to an image to change it as it is drawn. For example, the application can combine multiple images into one drawing, such as placing an animal's head on a person's body. The application can be used to write intricate lettering on anything or to create anamorphic drawings that look 3D.

As disclosed, the method can be an application running on a device that has a processor and memory. The device also has a camera and a display. Any image analysis is performed by the processor under control of the application. The application allows a user to create realistic drawing or paintings of any size, take step-by-step lessons to learn to draw without the application. It should be noted that any picture stored on the device can be used for drawings or lessons. The application also provides filters to apply to the images to make drawing easier. Additionally, drawings can be shared using the Application. Finished drawings can be uploaded to a library and shared with other users allowing other users to download and use the drawings as templates.

According to one aspect of the invention, there are video tutorials on how to use the application, which is available under the trade name Da Vinci Eye. The video tutorials are stored on a third party server and accessed by the device. In one embodiment, the drawing tutorials are downloaded to the device for viewing. Alternatively, the tutorials are links to media on a server. It should be noted that the tutorials can also be text documents.

It is to be understood that the invention is not limited to the exact details of construction, operation, exact materials or embodiments shown and described, as obvious modifications and equivalents will be apparent to one skilled in the art; for example, the entire cantilever strap could be provided with a shock absorbing pad disposed upon its lower surface. Accordingly, the invention is therefore to be limited only by the scope of the appended claims. While the specific embodiments have been illustrated and described, numerous modifications come to mind without significantly departing from the spirit of the invention.

I claim:

1. An apparatus for providing a template comprising:
   a camera;
   a display;
   a memory; and
   a processor configured to:
      allow a user to select an image to be drawn;
      captured a scene in real-time by the camera;
      overlay the image on the captured scene;
      break the image down into component parts corresponding to layers representing levels of darkness;
      display the component parts of the selected image individually on the display with the captured scene as a series of templates that each represent one of the layers for the levels of darkness.

2. The apparatus for providing a template according to claim 1, wherein the component parts of the selected image and the captured scene are superimposed onto a surface for a user to trace with a drawing apparatus.

3. The apparatus for providing a template according to claim 1, wherein the processor is further configured to compare a drawn image with a superimposed image.

4. The apparatus for providing a template according to claim 1, wherein the processor is further configured to provide image verification by comparing a respective image with a specific image captured in real-time by the camera.

5. The apparatus for providing a template according to claim 1, wherein the processor is further configured to:
   increase and decrease a displayed size the image using a zoom function; display the size adjusted image and the captured scene on the display; and tile the image if the size adjusted image is larger than the display.

6. The apparatus for providing a template according to claim 1, wherein the user is guided to complete the image following step by step instructions.

7. A method for providing a template comprising:
   selecting an image to be drawn from a memory of a device;
   overlaying the image on a scene captured in real-time by a camera of the device;
   breaking the image down into component parts, the component parts are one or more layers of colors and values that corresponds to levels of darkness;
   and
   displaying the component parts of the selected image individually on the display with the captured scene as a series of templates that each represent a respective color or value associated with a corresponding one of the levels of darkness.

8. The method for providing a template according to claim 7, wherein the templates are used to draw the image with a drawing apparatus.

9. The method for providing a template according to claim 7, wherein the templates are one of an enlarged or reduced version of the image.

10. The method for providing a template according to claim 7, further comprising:
   providing a tutorial to draw the image step-by-step.

11. The method for providing a template according to claim 7, further comprising:
   displaying grid lines on the display.

\* \* \* \* \*